UNITED STATES PATENT OFFICE 2,658,297

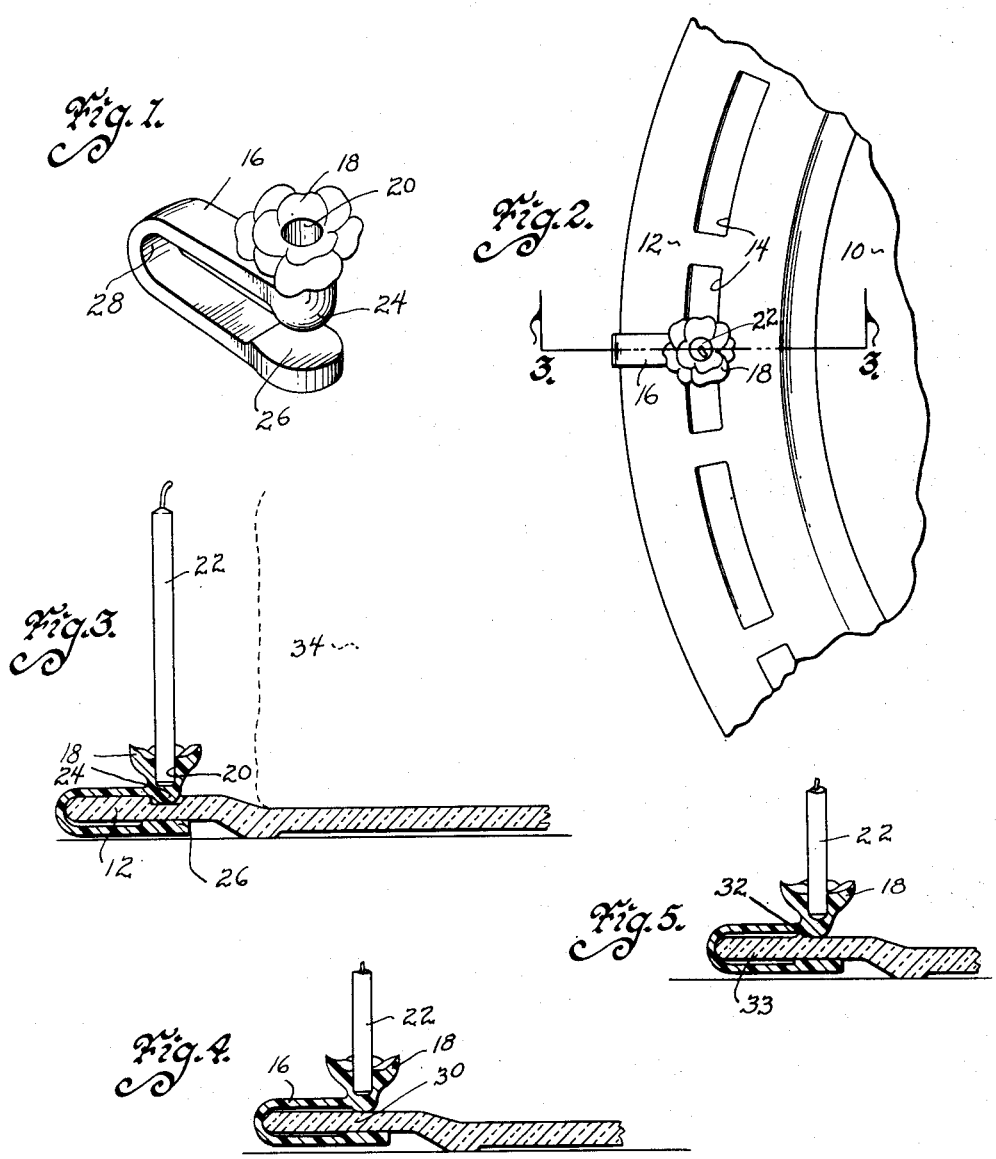

CAKE PLATE AND DECORATING DEVICE

Phyllis Ann Woolsey, Indianola, Iowa

Application September 4, 1951, Serial No. 244,881

4 Claims. (Cl. 41—10)

My invention relates to the art of providing a decorated cake as a part of the ceremonies on festive occasions such as birthdays, weddings and holidays such as Christmas, Valentine's Day or the like.

Specifically I have invented a cake plate which has means thereon for attaching the candles or other decorations to the plate rather than the cake and thereby avoiding damage or marring of frosting or the cake itself which detracts from the appearance of the cake until it is eaten.

Decorated cakes are an ancient art and a field in which many people have worked for many years, both professionally and as amateurs. Numerous cake decorating devices have been invented including means for holding candles on the top of birthday cakes primarily. Most of the candle holding devices to date, however, have been of the type that is supported on top of the cake by means of a long projection affixed to the candle holder. The projection is inserted through the frosting and into the cake which supports the candle holder in a vertical position. A candle inserted in the holder extends in a vertical path also and is securely held in this manner as it burns. When it is desired to cut the cake, it is necessary to remove the candle holders from the frosting, at least of the portions actually being served to potential consumers. Removing the candle holders almost invariably leaves a marred or damaged spot in the frosting which detracts from its appearance.

Other forms of candle holders have been devised such as one comprising a board like arrangement that has "happy birthday" or some such inscription thereon together with holes for receiving a plurality of candles. Such holders are merely placed on top of the cake and support the candles in a vertical position merely because the board is so broad. Such holders are even more objectionable than the pin type, however. While the latter damages the frosting at isolated points, the board type of holder mars a large central section of the frosting thus producing a very unsatisfactory looking cake when the holder is removed prior to cutting.

A further disadvantage of the well known forms of cake candle holders results from the fact that they contact portions of the cake which are eaten. Thus the holders which I know of are made from some edible material not because they are eaten, but to insure that they do not contaminate the cake or its frosting. This fact creates another disadvantage in that candle holders made of an edible material are subject to rather rapid deterioration particularly if an attempt is made to wash off cake and frosting clinging to the holders after they have been used. Leaving the holders unwashed, on the other hand, is unthinkable to most.

The shortcomings of the common birthday cake candle holders, have prompted at least one manufacturer to produce a cake plate that has a plurality of holes around its outer edge. The idea of this plate is to insert the candles into the plate holes rather than using any separate candle holders. While this cake plate has advantages over the usual holders discussed above, it is unsatisfactory in some respects. The candle receiving holes in the plate are not deep enough for one thing. Since the depth of the holes is limited by the thickness of the plate, they are not easily made as deep as normal candle holders. The fact that this plate has shallow holes in it makes it difficult to secure candles in the plate. By trial and error I have discovered that the plate holds candles satisfactorily only if some melted candle wax is inserted in the hole first. If the plate were made thick enough to receive a normal depth hole for the candle, it would be awkward looking and lack grace. Shallow as these holes in the plate are, however, they are difficult to clean when they become wax filled. Also, of course, one using this plate is limited to a single size of candle and the only variation possible becomes the color of the candles used.

In view of the foregoing, therefore, it is the principal object of my invention to provide a cake plate and decorating device that avoids marring or injuring the frosting of the cake resting on the plate.

It is a further object of my invention to provide a cake plate and decorating device that is easy to maintain in a clean and sanitary condition.

It is a further object of my invention to provide a cake plate and decorating device that is quick and easy to use.

It is a further object of my invention to provide a cake plate and decorating device that permits endless variety of both colors and sizes of candles employed.

It is a still further object of my invention to provide a cake plate and decorating device that does not require the candles or decorations to be removed while the cake is being cut.

It is a still further object of my invention to provide a cake plate and decorating device that avoids getting the candles, their holders or other decoration soiled with frosting or icing.

It is a still further object of my invention to provide a cake plate and decorating device that permits candles or other decorations to be transferred from the main cake plate to the individual serving plates as the cake is served.

It is a further object of my invention to provide a cake plate and decorating device that requires only the exact number of candle holders required for a birthday cake to be placed on the plate.

It is a further object of my invention to provide a cake plate and decorating device that aids the decorator of a cake in artistically grouping the candles and other decorations around the cake.

Objects other than these will undoubtedly be suggested to those skilled in the art.

My invention consists in the construction, arrangement, and combination of the various parts of the device, whereby the objects contemplated are attained as hereinafter more fully set forth, pointed out in my claims, and illustrated in the accompanying drawings, in which:

Fig. 1 is an enlarged perspective view of my decorating device in the form of a candle holder.

Fig. 2 is a top view of a fragment of my cake plate with the decorating device of Fig. 1 mounted thereon and holding a candle, Fig. 3 is a cross-sectional view of my cake plate and decorating device taken on the line 3—3 of Fig. 2. A portion of a cake is shown with broken lines, Fig. 4 is a cross-sectional view of my decorating device mounted on an ordinary straight edged plate, and Fig. 5 is a cross-sectional view of my decorating device secured to a modified form of my cake plate.

Referring to the drawings wherein like numbers refer to like parts, I have used the numeral 10 to designate my cake plate in its preferred form as shown in Fig. 2. Around the rim 12 of the plate and spaced a suitable distance from the edge thereof are a plurality of grooves or depressions 14 to aid in holding my decorating device on the plate as will be clearly explained in detail hereafter. These grooves are evenly spaced and arcuately shaped to form, in effect, a circle around the plate that is concentric with respect to the outer edge thereof. With the exception of these slots, the plate is like any other cake plate such as those that are well known and made of glass, plastic, wood, china or the like.

My decorating device is a spring clip 16 to which is secured a candle holder 18. The holder may be plain or preferably in the form of a flower or the like. A socket 20 is formed in the center of the holder to receive a candle 22 as is shown to advantage in Fig. 3. At the base of holder 18 or the inner top end of clip 16 is a knob or bulge 24 which engages depressions 14 to more securely fasten clip 16 to the plate rim 12 and guard against their being accidentally disconnected from each other. There is a heel or lump designated 26 formed on the lower inside end of spring clip 16. This heel is broad and flat to provide vertical stability to the clip. The inside curve 28 of clip 16 is flat laterally so as to engage the outer edge of plate rim 12 at more than one point. The clip is given additional stability as a result of this rim contacting structure.

My decorating device may be made from any suitable material such as plastic, metal, wood or the like. Some resiliency is the only requirement that is essential to proper material. The resiliency necessary is only such as to permit the spring clip 16 to yield enough to slide over the plate edge or ridge 32 in the case of the modified form of plate shown in Fig. 5. I have shown my clip as made of plastic. This is a preferred material because a clear plastic clip 16 would cause a minimum detraction from the effect created by the decorated plate. It is also obvious that the holder 18 could be made in a variety of shapes, colors and sizes. Large holders would receive larger candles. Holders could also be made to simulate a variety of animals or other shapes to decorate cakes for special occasions other than birthdays. Evergreen trees or Santa Clauses for Christmas or hearts for St. Valentine's Day are typical examples. Also, of course, a person once equipped with a plate could easily provide himself with numerous different holders. It would be easy to provide holders for a variety of candle sizes also, of course.

While the form of plate shown in Figs. 1, 2 and 3 is the preferred form for reasons which will be explained in detail under the heading of operation, my decorating device will also work very nicely with structures other than the preferred form. As is shown in Fig. 4, my decoration clip candle holder will grip on an ordinary smooth rimmed plate such as the one designated 30. In Fig. 5, I show a modified form of my plate in which the bulge 24 of clip 16 merely slides past a ridge or barrier 32 on plate rim 33. Thus it is possible for my clip to be used successfully with a variety of plates and will hold candles or other decorations upright and away from the cake just as it does in Fig. 3 with regard to cake 34. The preferred form of cake plate is particularly advantageous, however, as I will now show.

In using my cake plate, the baked and iced cake 34 is placed on the plate after the usual fashion. Suitable candle holders are then selected for the particular occasion and in the desired quantities. Each holder, if for a candle, is supplied with one in the usual manner and the clips are pushed onto the plate until knob 24 engages slot 14. Because the slots 14 are of a single size and spaced evenly around the plate, they may be used as a guide to place the decorating devices about the cake in pleasing groups or to space them equally. Since the holders do not touch the cake, they need not be removed when the cake is cut unless they are so numerous as to prevent the removal of a cut piece of cake. Also a candle may be removed from the main plate and mounted on an individual serving place if desired. The clip will operate satisfactorily on a normal plate or small serving plates equipped with slots such as the one designated 14 may be used. Each serving would be made very festive in this manner and additional pleasure provided to those at the party or like. It will also be immediately apparent to those who have washed dishes that my slotted plate will not be excessively difficult to clean. Likewise, the holders will be easily kept in clean and sanitary condition as they may be made of durable material since it does not contact the cake and can be rigorously cleaned without harmful effects.

Some changes may be made in the construction and arrangement of my cake plate and decorating device without departing from the real spirit and purpose of my invention, and it is my intention to cover by my claims, any modified forms of structure or use of mechanical equivalents which may be reasonably included within their scope.

I claim:

1. The combination of a plate having a rim; said plate having a depression arranged in its rim, a spring clip slidably and frictionally engaging said plate rim, a bulge formed on the inside of said spring clip and entering said depression to aid in frictionally securing said spring clip to said plate rim.

2. The combination of a plate having a rim; said plate having a plurality of elongated spaced apart curved depressions arranged in a circle in its rim, a plurality of spring clips each embracing the rim of said plate, a knob on each of said spring clips engaging one of said elongated curved depressions, and a plurality of decorations one secured to each of said spring clips.

3. The combination of a plate having a rim, said plate having a ridge arranged in a circle around its rim, at least one spring clip embracing said plate rim and having its ends extending beyond said ridge, a knob on said spring clip at a point just beyond said ridge, and a decoration secured to said spring clip.

4. In combination a plate having a rim; said plate having a depression in its rim, a spring clip embracing the rim of said plate, a bulge on said spring clip engaging the depression in said plate rim, a heel on said spring clip engaging said plate rim on the side opposite to that carrying the depression; said heel having a broad flat surface that engages said plate rim.

PHYLLIS ANN WOOLSEY.

References Cited in the file of this patent

UNITED STATES PATENTS

| Number | Name | Date |
|---|---|---|
| 111,281 | Walker | Jan. 24, 1871 |
| 1,511,004 | Pooch et al. | Oct. 7, 1924 |
| 1,933,691 | Young | Nov. 7, 1933 |
| 2,232,607 | Huppert | Feb. 18, 1941 |
| 2,322,519 | Ingebrigtsen | June 22, 1943 |
| 2,446,252 | Stromelly | Aug. 3, 1948 |
| 2,602,311 | Hansen | July 8, 1952 |